(No Model.)
H. RIX.
SINKER FOR FISHING TACKLE.
No. 285,075. Patented Sept. 18, 1883.
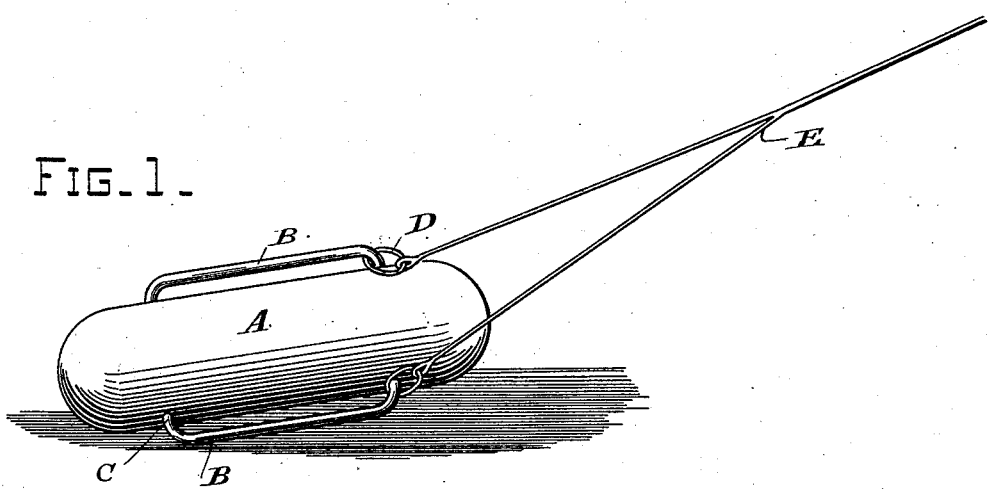
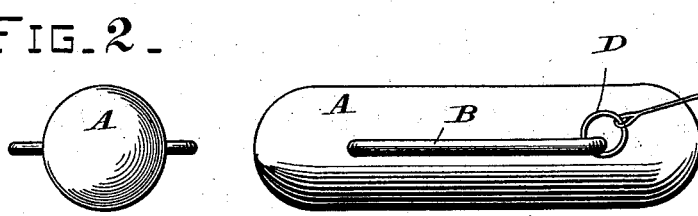
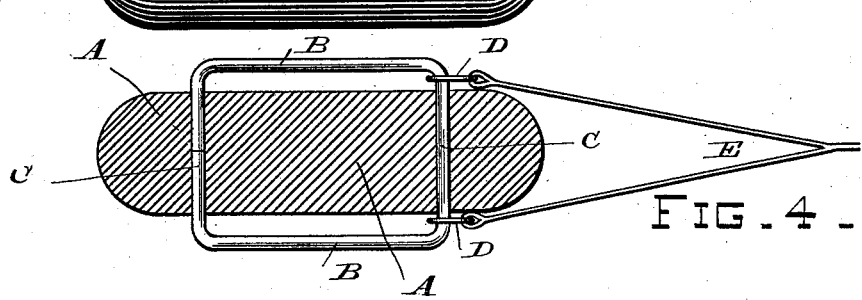
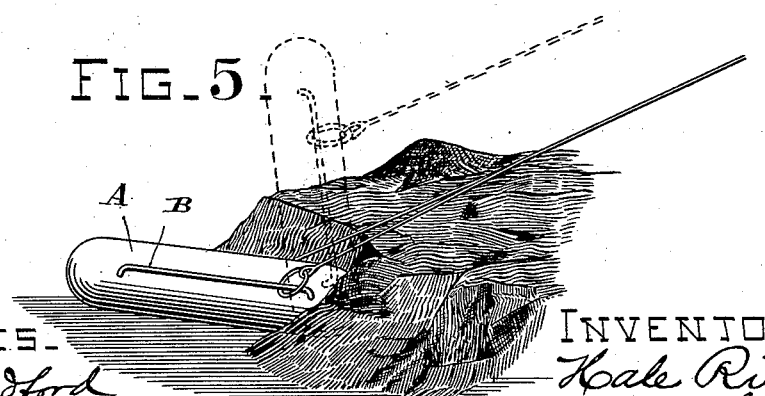
WITNESSES
Wilmer Bradford
Edwin Derby
INVENTOR
Hale Rix
By C. W. M. Smith
Attorney

UNITED STATES PATENT OFFICE.

HALE RIX, OF SAN FRANCISCO, CALIFORNIA.

SINKER FOR FISHING-TACKLE.

SPECIFICATION forming part of Letters Patent No. 285,075, dated September 18, 1883.

Application filed July 11, 1883. (No model.)

*To all whom it may concern:*

Be it known that I, HALE RIX, a citizen of the United States, residing at San Francisco, in the county of San Francisco and State of California, have invented a certain new and useful Sinker for Fishing Lines and Tackle, of which the following is a specification.

My invention relates to an improved sinker or plummet for use in connection with a line or cord employed for fishing purposes, and commonly designated as a "hand-line" or "lead-line," in contradistinction from such lines as are used with a pole or fishing-rod.

In fishing with an ordinary sinker (made usually of lead cast in a conical form, with an opening near the apex for the attachment of the line) great inconvenience has been experienced, owing to the fouling of the sinker with rocky obstructions upon the bottom of the fishing-ground, such fouling frequently resulting in the parting of the line and loss of the sinker; and the object of my invention is to avoid these difficulties and provide a sinker which may be easily and quickly disengaged from any cramped or wedged position among rocks or other obstructions upon the bottom of the sea or fishing-ground. This object I accomplish by means of the device illustrated in the accompanying drawings, in which—

Figure 1 is a perspective view of my improved sinker. Fig. 2 is an end view. Fig. 3 is a side view. Fig. 4 is a longitudinal section. Fig. 5 is a perspective view, showing the sinker in actual use.

Similar letters of reference are used to designate like parts throughout the several views.

I construct my sinker A of lead or other suitable metal, which is cast in the form of a cylinder having semi-spherical ends; but before making the casting I take a piece of stout iron or steel wire and bend it into a rectangular form, as shown in Fig. 4, the meeting ends being upon one of the short sides of the parallelogram, and being united by welding, if so desired. The bended wire is then placed in a mold of suitable construction, and the molten lead is poured in and forms a round-ended cylinder, having the two long sides or rods B B of the wire rectangle extended a short distance from the sides of the cylinder, and extending along the length thereof at a short distance from either end, as clearly seen in Fig. 1. The greater portion of the short sides C C of the wire rectangle are embedded in the lead, and the wires are thus firmly held in place, with the longer wires projected beyond the sides of the sinker at points diametrically opposite to each other, as seen in Fig. 2. The rods B B form guides for the metal rings D D, which are placed around them, and to which is attached the bifurcated cord or line E, and these rods, by being projected somewhat from the sides of the sinker, tend to prevent either of the two divisions of the line from getting beneath the end of the sinker, as they act upon the same principle as the stock of an anchor, and serve to keep the attached ends of the bifurcated line in a nearly horizontal position.

Should the sinker, while in use, meet with any obstruction—such as is shown in Fig. 5, in which the draft end of the sinker has become cramped, wedged, or entered in a crevice in a rock—a steady pull upon the line will convert the sinker into a lever of the third class and cause it to move or fulcrum upon that end nearest the cord or line, and as the strain upon the line continues or increases, the sinker will assume a perpendicular position, and the rings D D will slide upward upon the side or guide rods, B B, and the leverage will thereby be increased until by a slight pull the sinker will be thrown over end for end and lie flat upon its side in advance of its former position.

If found convenient, the sinker may be provided with a central longitudinal slot traversed by a transverse bar, to the outer ends of which the end of the fish-line may be attached; but I have found by actual test that the form of construction above described is best adapted for practical purposes.

Having thus described my invention, what I claim, and desire to secure by Letters Patent, is—

A sinker or plummet for fishing-tackle, consisting of a cylindrical body, A, having rounded ends and projecting guide-rods B B, extending lengthwise of the body and adapted to carry the rings or loops D D, to which the line is attached, substantially as shown and set forth.

In testimony that I claim the foregoing I have hereunto set my hand and seal.

HALE RIX. [L. S.]

Witnesses:
WILMER BRADFORD,
CHAS. E. KELLY.